Dec. 12, 1950     C. E. DE WITT     2,534,109
TRACTOR HITCH

Filed July 6, 1948     2 Sheets-Sheet 1

INVENTOR.
Charles E. DeWitt
BY
Frease and Bishop
ATTORNEYS

Dec. 12, 1950 C. E. DE WITT 2,534,109
TRACTOR HITCH

Filed July 6, 1948 2 Sheets-Sheet 2

INVENTOR.
Charles E. DeWitt
BY
ATTORNEYS

Patented Dec. 12, 1950

2,534,109

UNITED STATES PATENT OFFICE 2,534,109

TRACTOR HITCH

Charles E. De Witt, Big Prairie, Ohio

Application July 6, 1948, Serial No. 37,199

5 Claims. (Cl. 280—33.44)

The invention relates to tractor draw bars, and more particularly to a novel hitch especially adapted for use in association with a popular type of tractor, known as the "Ferguson" tractor, such as disclosed in Ferguson Patents No. 2,118,180 and No. 2,118,181 of May 24, 1938.

With tractors of this general type much difficulty has been experienced in making turns at the ends of fields and the like, when a farm implement, such as a pole-type disc is attached to the tractor. Another difficulty has been encountered where it is desirable to couple an implement off center so that it will follow at one side of the tractor.

A principal object of the invention is to provide a simple, inexpensive and easily operated tractor hitch which will overcome the above and other difficulties.

Another object is to provide a tractor hitch including a frame which is quickly and easily attachable to and removable from a tractor, without the use of bolts, screws, or other fastening devices, and which is securely held in position upon the tractor when attached thereto.

A further object is to provide such a tractor hitch in which the detachable frame includes a swinging draw bar to which the farm implements are connected.

A still further object is to provide detachable means for holding the draw bar in any desired position relative to the frame.

Another object is to provide a tractor hitch of this character which may be connected to the customary "Ferguson" hitch, provided upon tractors of this type, without necessitating any change in the construction thereof.

It is a further object of the invention to provide such a tractor hitch comprising a detachable frame having hooks for engaging beneath the usual lift arms of the "Ferguson" hitch, and hooked bars for engaging in certain of the apertures of the "Ferguson" hitch bar, and a swinging draw bar movable over the top of said hitch bar and having means engaging the under side of the hitch bar, whereby all of the advantages of the "Ferguson" hitch are obtained.

Figure 1:
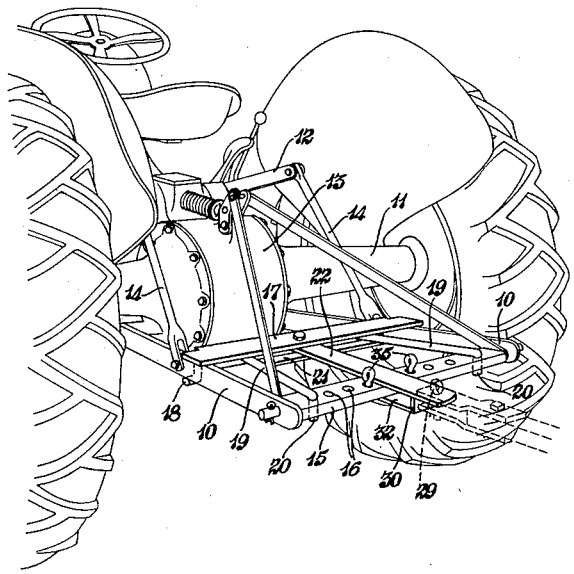
Figure 2:
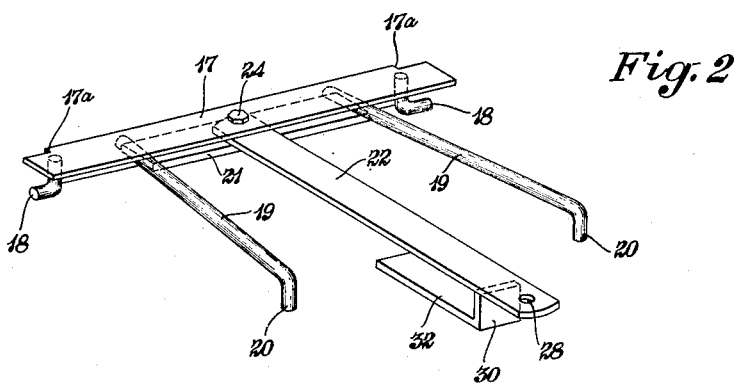
Figure 3:
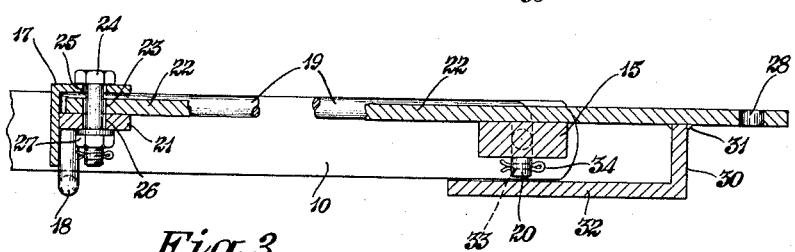
Figure 4:
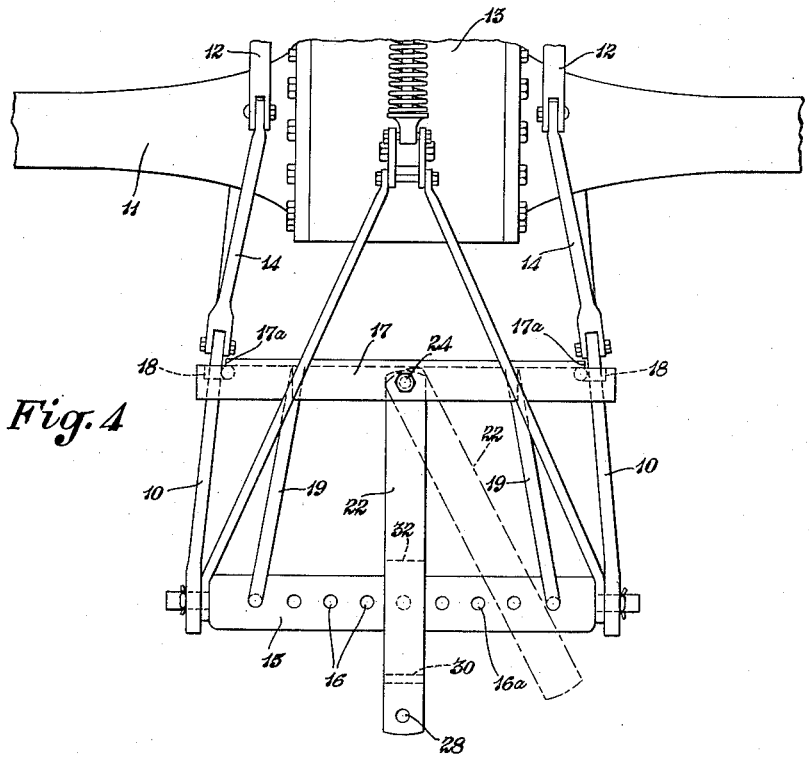
Figure 5:
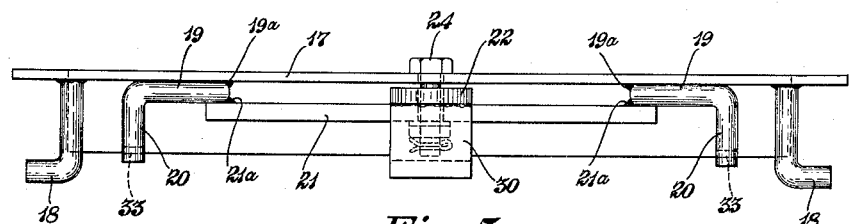

The above objects, together with others which will be apparent from the drawings and following description, or which may be later referred to, may be attained by constructing the improved tractor hitch in the manner hereinafter described in detail and illustrated in the accompanying drawings, in which;

Figure 1 is a perspective view of the rear portion of a tractor provided with a "Ferguson" hitch, showing the improved tractor hitch attached thereto for connection to a farm implement;

Fig. 2 a detached, perspective view of the improved tractor hitch to which the invention pertains;

Fig. 3 an enlarged, fragmentary, longitudinal, sectional view through the improved tractor hitch, showing it mounted upon the "Ferguson" hitch of a tractor;

Fig. 4 is a top plan view of the rear portion of a tractor showing the improved tractor hitch detachably connected to the "Ferguson" hitch thereon;

Fig. 5 an enlarged rear edge elevation of the improved tractor hitch; and

Figure 6:
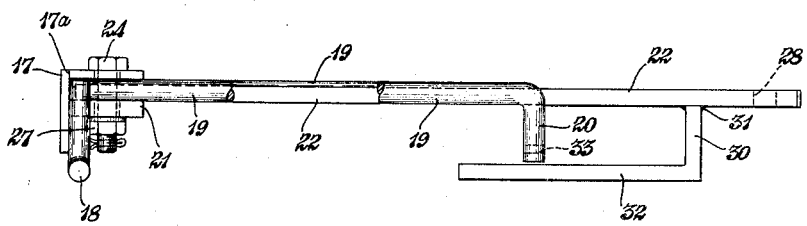

Fig. 6 a side elevation of the same.

The invention is shown as applied to a power driven tractor having a Ferguson hitch such as disclosed in the Ferguson patents above referred to. This type of hitch comprises generally the rearwardly extending draw bars 10, pivotally connected to the tractor beneath, and somewhat forwardly of the tractor axle housing 11. Hydraulic lift arms 12 are journalled upon the tractor housing 13 and connected by lift rods 14 with the draw bars 10. The hitch bar 15 is connected to the rear ends of the draw bars 10, and provided with a longitudinal series of apertures 16 to receive the pin or draw bolt of the clevis or coupling member of a farm implement.

This mechanism is designed to sustain the thrust resulting from a normal load with the result that the plow or other implement, connected to the hitch bar, is maintained in effective engagement with the earth, but should the load exceed a predetermined maximum, such as when a buried rock is struck by the plow, the hydraulic control mechanism is operated, swinging the hydraulic lift arms upwardly, and through the links 14 raising the draw bars 10 and hitch bar 15 so as to elevate the plow to clear the obstruction.

All of the above described mechanism is common in tractors provided with a Ferguson hitch and is illustrated and briefly described merely for the purpose of disclosing the manner in which applicant's improved tractor hitch may be applied to a tractor provided with a Ferguson hitch without making any alteration therein or interfering with the normal operation thereof.

The improved tractor hitch, to which the invention pertains, is adapted to be easily and readily connected to, or detached from, the above described Ferguson hitch mechanism, and comprises generally the cross hanger in the form of an angle iron 17, having the outwardly disposed depending hooks 18 near opposite ends for engagement under the draw bars 10 of the Ferguson hitch, the depending vertical flange of the angle iron 17 being cut away at each end adjacent to said hooks, as indicated at 17a.

Rearwardly disposed, diverging rods 19 are welded, or otherwise rigidly connected, to the under side of the horizontal top flange of the angle iron 17, as indicated at 19a, the rear ends thereof being downturned, as indicated at 20.

A bar 21 is spaced below, and parallel with, the horizontal top flange of the angle iron 17, the ends thereof being welded, or otherwise rigidly connected, to the under sides of the rods 19, as indicated at 21a.

A draw bar 22 has it forward end located between the horizontal top flange of the angle iron cross hanger 17 and the bar 21, and is provided with an aperture 23 receiving the bolt 24, which is located through suitable apertures 25 and 26 in the angle iron cross hanger 17 and bar 21 respectively, to pivotally connect the draw bar 22 thereto, a nut 27 being located upon the lower end of the bolt to retain the draw bar.

The rear end of the draw bar 22 is provided with an aperture 28 to receive the pin or draw bolt of a clevis or other coupling for farm implements, as indicated in dotted lines at 29 in Fig. 1. An angular bar 30 is welded, or otherwise rigidly connected, to the under side of the draw bar 22, near the rear end thereof, as indicated at 31, and the forwardly extending terminal arm 32 thereof is adapted to extend beneath the hitch bar 15 of the Ferguson hitch mechanism as will be later described.

In attaching the improved tractor hitch to a tractor, the angle iron cross hanger 17 is placed with the ends of the top flange thereof beyond the cut outs 17a, upon the upper sides of the draw bars 10 of the Ferguson hitch mechanism and the depending, out-turned hooks 18 are engaged under said draw bars 10, and the entire device is slidably moved forwardly upon the draw bars 10 to a point where the depending ends 20 of the rods 19 may be engaged in apertures 16 of the Ferguson hitch bar 15, the draw bar 22 of the improved tractor hitch thus resting upon the top of the Ferguson hitch bar 15, while the forwardly disposed portion 32 of the angle bar 30 is located beneath the same.

If desired, fastening means may be provided upon the downturned, rear ends 20 of the rods 19, to prevent the same from being withdrawn from the apertures in the hitch bar 15. For this purpose apertures 33 may be provided in the lower ends of the depending portions 20 of the rods 19 to receive cotter pins or the like, as indicated at 34 in Fig. 3.

With this construction the improved tractor hitch may be quickly and easily mounted upon the Ferguson hitch mechanism of the tractor and the draw bar 22 may swing freely over the top of the hitch bar 15 between the diverging rods 19. Thus short turns can be easily made at the ends of fields and the like and the implement will properly track behind the tractor.

If it is desired to hold the pivoted draw bar in any desired position bolts or pins, as indicated at 35 in Fig. 1, may be placed in apertures 16 of the hitch bar on each side of the draw bar 22 so as to limit the swinging movement of said draw bar.

If it is desired to have the implement operated at one side of the path of the tractor, the pivoted draw bar 22 may be located against one of the rods 19, as indicated in broken lines in Fig. 4, and a bolt or pin may be placed in the appropriate aperture, indicated at 16a in said figure, so as to hold the draw bar in the broken line position.

It will be seen that the improved tractor hitch may be quickly and easily removed from the tractor, when necessary or desirable, by merely lifting the depending ends of the rods 19 out of engagement with the apertures in the hitch bar and disengaging the hooks 18 from the draw bars 10 of the tractor.

With this construction of tractor hitch it will be obvious that a simple, efficient and durable tractor hitch is provided, which may be quickly and easily attached to a tractor, without the use of bolts or other fastening means, and which may be adjusted to any desired position.

I claim:

1. In combination with a tractor having a pair of rearwardly disposed draw bars and a hitch bar connected to the rear ends of the draw bars and having a longitudinal series of apertures therein, a tractor hitch comprising a transversely extending cross hanger for contact with the upper sides of said draw bars, depending hooks near the ends of said cross hanger for engagement with the under sides of said draw bars, a spaced pair of rearwardly disposed rods connected to the cross hanger and having downturned rear ends for engagement in certain of the apertures in the hitch bar, and a draw bar pivoted to the cross hanger and slidable over the top of the hitch bar and extending in rear of the hitch bar.

2. In combination with a tractor having a pair of rearwardly disposed draw bars and a hitch bar connected to the rear ends of the draw bars and having a longitudinal series of apertures therein, a tractor hitch comprising a transversely extending cross hanger for contact with the upper sides of said draw bars, depending hooks near the ends of said cross hanger for engagement with the under sides of said draw bars, a spaced pair of rearwardly disposed rods connected to the cross hanger and having downturned rear ends for engagement in certain of the apertures in the hitch bar, fastening means upon said downturned rear ends, and a draw bar pivoted to the cross hanger and slidable over the top of the hitch bar and extending in rear of the hitch bar.

3. In combination with a tractor having a pair of rearwardly disposed draw bars and a hitch bar connected to the rear ends of the draw bars and having a longitudinal series of apertures therein, a tractor hitch comprising a transversely extending cross hanger for contact with the upper sides of said draw bars, depending hooks near the ends of said cross hanger for engagement with the under sides of said draw bars, a spaced pair of rearwardly disposed rods connected to the cross hanger and having downturned rear ends for engagement in certain of the apertures in the hitch bar, and a draw bar pivoted to the cross hanger and slidable over the top of the hitch bar and extending in rear of the hitch bar, and a depending angle bar connected to the pivoted draw bar and having an arm located beneath said hitch bar.

4. In combination with a tractor having a pair of rearwardly disposed draw bars and a hitch bar connected to the rear ends of the draw bars and having a longitudinal series of apertures therein, a tractor hitch comprising a transversely extending cross hanger for contact with the upper sides of said draw bars, depending hooks near the ends of said cross hanger for engagement with the under sides of said draw bars, a spaced pair of rearwardly disposed rods connected to the cross hanger and having downturned rear ends for engagement in certain of the apertures in the hitch bar, fastening means upon said downturned rear ends, a draw bar pivoted to the cross hanger and slidable over the top of the hitch bar and extending in rear of the hitch bar, and a depending angle bar connected to the pivoted draw bar and having an arm located beneath said hitch bar.

5. In combination with a tractor having a pair of rearwardly disposed draw bars and a hitch bar connected to the rear ends of the draw bars and having a longitudinal series of apertures therein, a tractor hitch comprising a transversely extending cross hanger for contact with the upper sides of said draw bars, depending hooks near the ends of said cross hanger for engagement with the under sides of said draw bars, a spaced pair of rearwardly disposed rods connected to the cross hanger and having downturned rear ends for engagement in certain of the apertures in the hitch bar, a bar fixed to the under sides of said rods beneath the cross hanger, and a draw bar pivoted to the cross hanger and said bar and slidable over the top of the hitch bar and extending in rear of the hitch bar.

CHARLES E. DE WITT.

REFERENCES CITED

The following references are of record in the file of this patent:

UNITED STATES PATENTS

| Number | Name | Date |
| --- | --- | --- |
| 2,379,225 | Fraga | June 26, 1945 |
| 2,392,903 | Currie | Jan. 15, 1946 |